United States Patent [19]

Keon et al.

[11] Patent Number: 5,046,392

[45] Date of Patent: Sep. 10, 1991

[54] CUTTER FOR PREPARING AN INSULATION BATT FOR INSTALLATION

[76] Inventors: Richard Keon, P.O. Box 240062, Charlotte, N.C. 28224; Luther Morris, 343 Scaleybark Rd., Charlotte, N.C. 28220

[21] Appl. No.: 334,302

[22] Filed: Apr. 6, 1989

[51] Int. Cl.⁵ .............................................. B26D 3/06
[52] U.S. Cl. ....................................... 83/862; 83/875; 83/880; 83/881; 83/455; 83/485; 83/614
[58] Field of Search ................. 83/862, 863, 864, 877, 83/882, 886, 455, 485, 489, 614, 620, 875, 880, 881

[56] References Cited

U.S. PATENT DOCUMENTS

| | | | |
|---|---|---|---|
| 821,866 | 5/1906 | Dobbs et al. | 83/614 |
| 2,727,571 | 12/1955 | Sayles | 83/614 |
| 2,765,037 | 10/1956 | McDonough et al. | 83/489 |
| 3,821,915 | 7/1974 | Larrable | 83/455 |
| 3,890,868 | 6/1975 | Pizkler | 83/614 |
| 3,918,337 | 11/1975 | Lindblad et al. | 83/614 |
| 3,996,827 | 12/1976 | Logan | 83/614 |
| 4,407,179 | 10/1983 | Iwase et al. | 83/875 |
| 4,590,835 | 5/1986 | Sobel | 83/862 |

Primary Examiner—Frank T. Yost
Assistant Examiner—Scott A. Smith
Attorney, Agent, or Firm—Shefte, Pinckney & Sawyer

[57] ABSTRACT

A method and apparatus for severing a length of insulating batting and simultaneously cutting only the insulating material thereof is provided. The insulating material between the severed edge of the insulation batting and the cutting line through the insulating material can be removed to expose a length of backing which can be secured to the uncut portion of the insulation batting length when the insulation batting length is wrapped around a length of a heating and cooling duct or the like. The apparatus includes a pair of rotating cutting wheels rotatably mounted on a carriage movable along an elongate carriage rail. A pinion gear mounted to each rotating cutting wheel for rotation therewith meshes with a rack secured to the elongate carriage rail to cause rotation of the rotating cutting wheel in response to movement of the carriage along the carriage rail.

13 Claims, 4 Drawing Sheets

CUTTER FOR PREPARING AN INSULATION BATT FOR INSTALLATION

BACKGROUND OF THE INVENTION

The present invention relates to a method and apparatus for cutting a predetermined length of insulation batt in a manner that leaves an exposed length of backing material which can be used to assist in installing the length of insulation batting.

One type of insulating material used in building structures and the like is typically supplied in rolls of various diameters, such rolls being formed from rolled up, elongated lengths of insulation batting which comprises a sheet of an insulating material such as fiberglass fibers that is several inches thick, with one face of the fiberglass fiber sheet being adhered to a backing of aluminum covered paper or the like of substantially less thickness.

It is frequently desirable to use such insulating material to enhance the heat transfer characteristics of the individual duct lengths of a heating and cooling system of a structure such as a building so that the heated and/or cooled air moving therethrough is not disadvantageously dissipated during its passage through the ducts. To this end, one practice for enhancing the heat transfer characteristics of the duct lengths involves encircling the outer circumferential surface of the duct lengths with conventional insulating materials, such as the insulation batting to improve the heat transfer characteristics of the duct lengths. The insulation batting is particularly suitable for efficient and dependable installation on the duct lengths since it comprises an effective insulating medium of several inches thickness of relatively loosely intertwined fiberglass fibers adhered to an aluminum covered backing and this combination of the fiberglass fibers and a relatively smooth, easily graspable backing is a product particularly suited for handling, cutting and securing in discrete, readily assemblable lengths.

Insulation installers usually follow either a simple procedure or a slightly more time consuming second procedure for installing the insulation on the ductwork. The simple procedure involves unrolling a length of insulation batting from a commercially available roll of insulation batting material to obtain an unrolled length of insulation batting slightly greater than the circumference of the duct to be insulated, severing the insulation length from the roll of insulation and installing the severed length in encircling disposition about the duct. Since the insulation length is slightly greater than the circumference of the duct, the edge portions thereof which extend axially along the duct length slightly overlap one another, thereby providing an area through which staples or the like can be driven to permanently secure the insulation length in its encircling dispostion about the duct length. While this simple procedure permits relatively rapid installation of the insulation lengths on the duct lengths, the overlapped edge portions of the duct insulation pieces tend to create a relatively bulky, non-uniform seam because the overlapped portion has a thickness roughly twice that of the rest of the insulation length. For this reason, insulation installers have developed a second installation procedure which, although relatively more time consuming than the simple procedure described above, tends to provide a more uniform, more easily securable seam. In this second procedure, once the insulation length has been severed from the insulation roll using a hand-held knife, the insulation installer uses the same knife to cut through the insulation length sufficiently to completely cut through the thickness of fiberglass fibers, but not into the aluminum covered backing, along a cutting line generally parallel to, and spaced several inches inwardly from, one of the severed edges of the insulation length. Thereafter, the insulation installer manually removes the band of fiberglass fibers between that cutting line and the severed edge to expose the inside surface of the aluminum covered backing along a generally elongate rectangular strip, and the removed fiberglass fibers are discarded. The thus prepared insulation length is then disposed in encircling disposition on the duct length and the remaining fiberglass fiber thickness of the insulation piece, which now is approximately equal to the circumference of the duct length, is disposed in facing contact with the outer circumferential surface of the duct length. Since the strip of exposed aluminum covered backing overlaps the adjacent aluminum covered backing adjacent the other overlapping edge, the installation installer can then drive staples through the strip of exposed aluminum covered backing into the overlapped aluminum covered backing and fiberglass fibers therebelow to secure the insulation length in permanent encircling disposition about the duct length.

While providing a more uniform and securable seam, the second insulation length preparation procedure is time consuming and requires that the installer have the skill to exert a relatively high degree of care during cutting of the fiberglass fibers to avoid penetrating the aluminum covered backing. Moreover, to achieve a cutting line sufficiently parallel to the adjacent edge of the fiberglass fiber thickness, the insulation installer must typically use a straight edge member such as a ruler, thus adding to the insulation length preparation time and the difficulty of the operation. Finally, this procedure requires increased handling and manipulating of the insulation, which is undesirable because of the known abrasive characteristics of fiberglass and similar insulating materials.

SUMMARY OF THE INVENTION

By the present invention, a method and apparatus are provided which accurately and reliably cut and prepare a strip of insulating material for removal from the backing upon which it is mounted.

The insulation cutting apparatus of the present invention provides a means for accurately severing each insulation length from the insulation roll to provide an insulation length of proper size for disposing on a duct length as well means for rapidly and accurately cutting the fiberglass thickness to facilitate the removal thereof to expose an aluminum covered backing strip.

Briefly described, the present invention provides a method and apparatus for severing a length of insulation batting from a supply thereof along a severing path, the insulation batting having insulating material mounted on a backing, and for cutting along a cutting path through the insulating material substantially without cutting the backing to create a discreet band of insulating material which is easily removable to expose a strip of backing thereunder. A surface is provided for supporting the portion of the insulation batting between and adjacent the severing path and the cutting path, and first cutter means is movable relative to the support surface, with the support surface means having a severing path support portion positioned with respect to the first cutter means to cooperate therewith for causing the first cutting means to cut through the insulating material and the backing along the severing path, thereby severing the insulation batting length from the insulation batting supply. Second cutter means is movable relative to this support surface, the support surface means having a cutting path support portion positioned with respect to the second cutter means to cooperate therewith for causing the second cutter means to cut through only the insulating material substantially without cutting the backing, thereby creating a discreet band of insulating material adjacent one edge of the insulation batting which is easily removable to expose the backing thereunder. Preferably, the severing path and the cutting path are generally parallel to one another and the first and second cutter means are located in a predetermined spaced relation to one another.

In one preferred embodiment, the first and second cutter means are mounted in a carriage and the carriage is movable along a carriage rail. The carriage rail is movable between a cutting position in which the first cutter means cuts the insulation batting and a second cutter means cuts the insulating material during movement of the carriage along a carriage rail, and a feeding position in which the first and second cutter means are sufficiently spaced from the support surface means to permit feeding of the insulation batting over this support surface means in a direction generally transverse to the direction of movement of the carriage along a carriage rail.

According to one aspect of the present invention, an insulation supply holder is provided for holding the insulation batting supply in a convenient disposition for feeding of lengths of insulation batting therefrom, and a cutting bed is provided for supporting the insulation batting length, backing side down, during the severing and cutting of the insulation batting length, the cutting bed including a slot member defining a longitudinal severing slot and a cutting platform of generally resilient, deflectable material. Additionally, a traveling dual cutter assembly having a carriage is provided and a pair of laterally spaced cutting wheels. A pair of axles rotatably mount the cutting wheels to the carriage. A generally elongate guide rail is provided for supporting the carriage for travel therealong, the guide rail having a pair of laterally spaced, generally parallel, longitudinally extending gear racks, and the guide rail is supported by a guide rail support frame above the cutting bed. The frame includes means for permitting movement of the guide rail between a cutting position at which the traveling dual cutter assembly supported thereon engages the insulation for severing and scoring thereof and an insulation feed position at which sufficient clearance is provided between the guide rail and the cutting bed for the feeding of insulation therebetween. The traveling dual cutter assembly further includes a pinion gear secured to each axle, each pinion gear being adapted to engage one of the longitudinal gear racks of the guide rail for rotation therealong in response to travel of the carriage along the guide rail, whereby the cutting wheels are caused to rotate in response to travel of the carriage along the guide rail and the guide rail. The carriage and the cutting bed are arranged relative to one another such that one of the cutting wheels penetrates through the insulation length into the longitudinal severing slot to sever the insulation length from the insulation supply and such that the cutting platform deflects sufficiently in response to the force exerted thereagainst by the other cutting wheel to permit the backing to pass between the other cutting wheel and the cutting platform without being cut by the other cutting wheel, whereby the other cutting wheel cuts the insulating material so that the insulating material located between the two cutting elements is removable to expose a predetermined length of the backing.

DETAILED DESCRIPTION OF THE PREFERRED EMBODIMENTS

Figure 1:
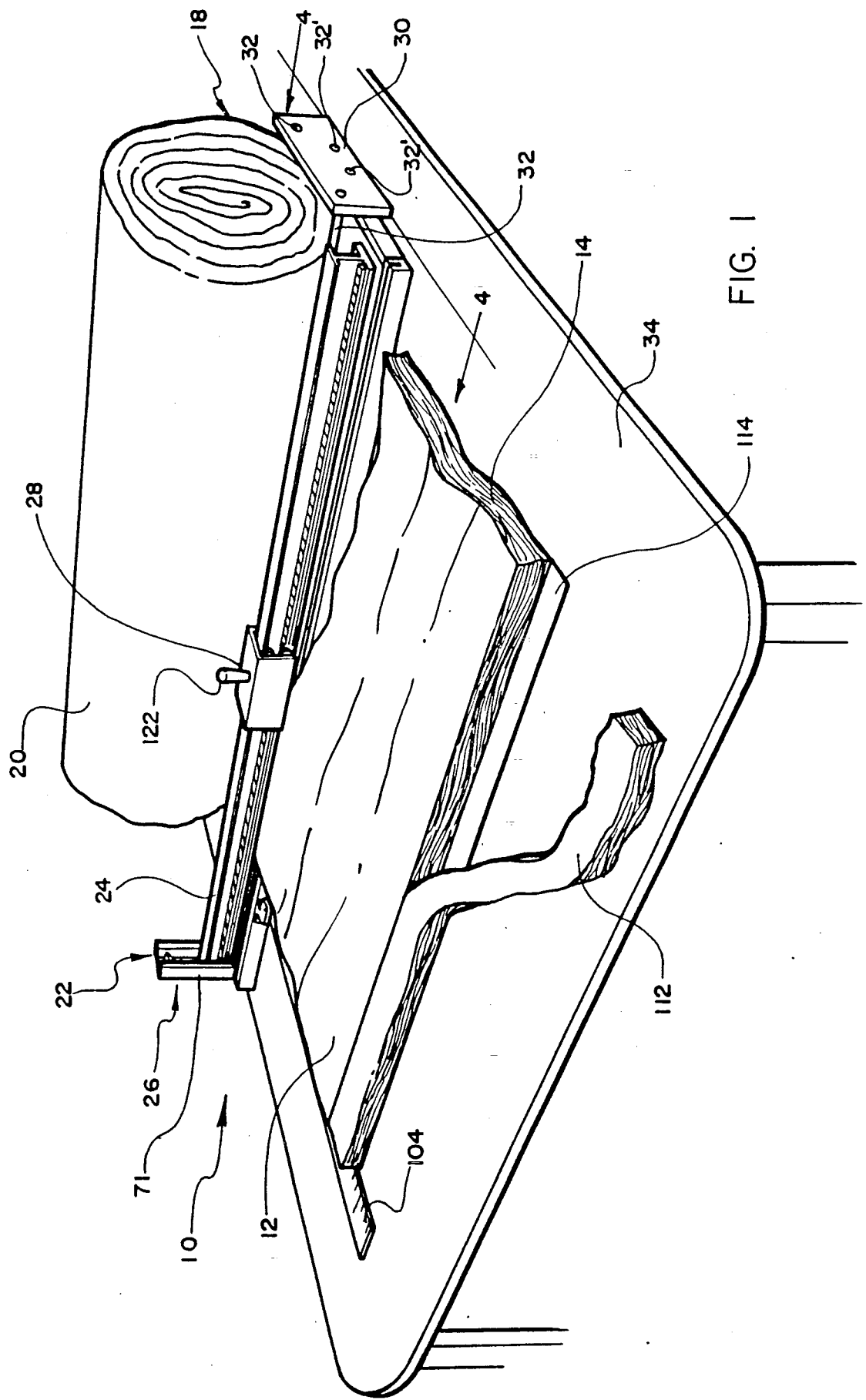
FIG. 1 is a perspective view of the insulation cutter of the present invention, shown with a roll of insulation batting disposed thereon with a length thereof disposed in the insulation cutter, and additionally showing the insulation batting length being engaged by the traveling dual cutter assembly of the insulation cutter of the present invention.

In FIGS. 1–5, one preferred embodiment of the insulation cutting apparatus of the present invention is illustrated and is generally designated as 10. The insulation cutting apparatus 10 is adapted to prepare a length 12 of insulation batting 14 for installation in an encircling disposition about an individual duct length 16 or the like in a manner to be described presently. The insulation cutting apparatus 10 basically includes a cradle assembly 18 for supporting a supply of the insulation batting 14 in the form of a roll 20, an insulation support surface assembly 22, a guide rail 24, a guide rail support assembly 26 and a traveling dual cutter assembly 28.

The cradle assembly 18 includes a pair of rectangular metal plates 30 disposed in parallel, spaced relationship to one another and interconnected by four rod assemblies. Two such rod assemblies 32 are shown in FIG. 1 and include a solid rod threaded at both ends and a tubular covering rotatably disposed on the rod. Each threaded rod end is inserted through a throughbore in a respective one of the plates 30 and the rod is secured thereto by a nut. As best seen in FIG. 1, one of the rod assemblies 32 is connected to the pair of plates 30 adjacent one pair of facing, upper corner portions thereof while a second rod assembly is connected to the pair of plates 30 adjacent the other facing, upper corner portion thereof. The other two rod assemblies 32' are secured to the plates 30 in generally parallel relationship to one another with their ends rotatably received in throughbores adjacent the lower middle portion of the plates 30 to permit free rotation of the roll 20 in the cradle assembly 18 in a manner well known in the art. The length of the rod assemblies 32 is slightly greater than the width of the insulation roll 20. Accordingly, the cradle assembly 18 supports the insulation roll 20 for rotation about it own axis when it is placed thereon with its axis parallel to the rod assemblies 32, and the pair of rod assemblies secured to the upper corners of the plates 30 act to retain the insulation roll 20 in the cradle assembly 18 during rotation thereof to unroll lengths of insulation therefrom, while the lower pair of rod assemblies 32' provide support for the bottom of the insulation roll 20 during such rotation. The cradle assembly 18 thus retains the insulation roll 20 in a stable manner on a support surface such as, for example, a table 34, during unrolling of the insulation batting material 14 from the roll.

Figure 4:
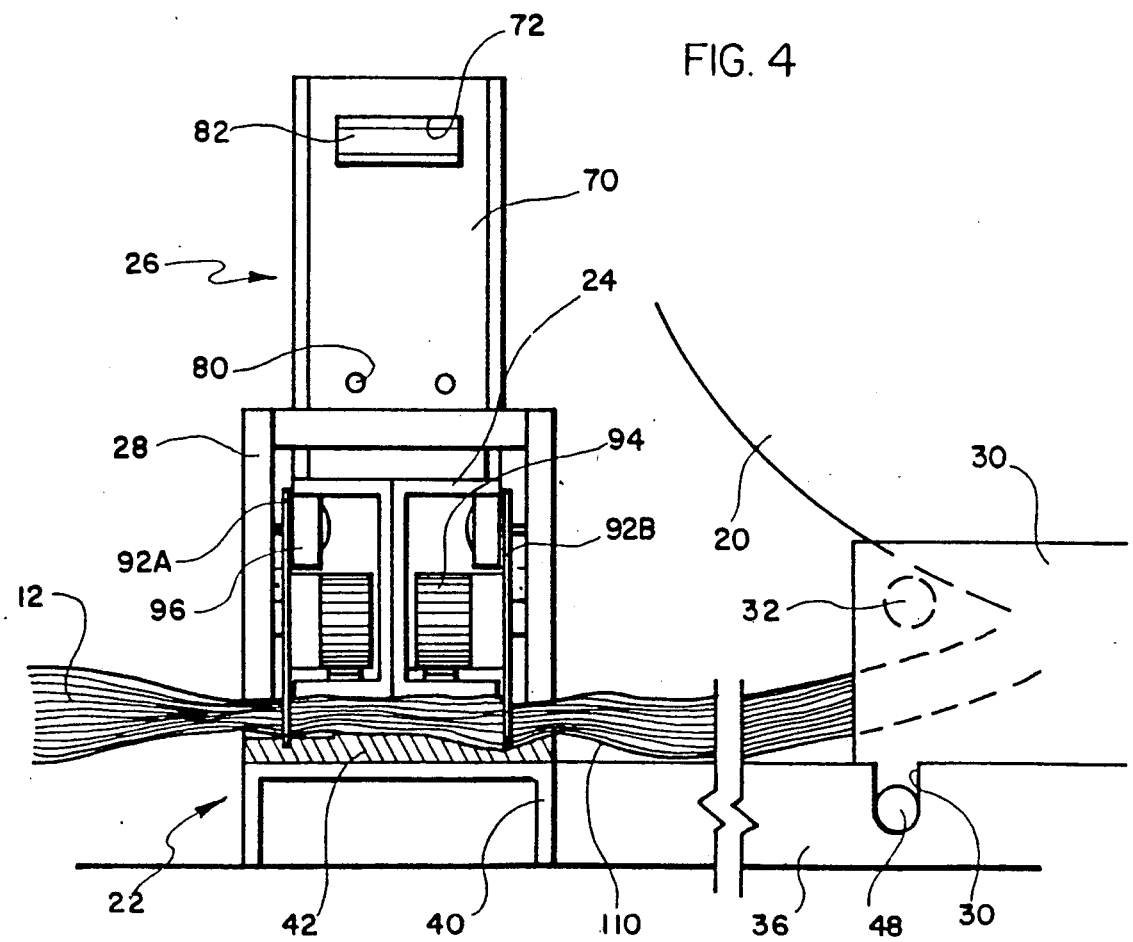
FIG. 4 is a side elevational view, taken along lines IV—IV in FIG. 1, showing the differing relative depths to which each cutter wheel of the traveling dual cutter assembly cuts the length of insulation batting disposed between the cutting bed and the guide rail.

As best seen in FIG. 4, the cradle assembly 18 is interconnected by a pair of flanges 36 to the insulation support surface assembly 22. Each flange 36 extends from, and is generally parallel to , a respective one of the plates 30 and is releasably coupled thereto by a retaining pin projecting perpendicularly from the plate 30 and seated in a slot 38 of the flange. Each flange 36 is also connected by welding or other means to the insulation support surface assembly 22.

The apparatus that provides a surface for supporting the insulation batting includes a U-shaped elongate metal beam 40 disposed on the table 34 to present a horizontally disposed surface, an elongate strip 42 of elastomeric material, such as rubber, of slightly smaller length than the metal beam 40, and a pair of rectangular, elongate metal lengths 44. The rubber strip 42 is disposed generally axially centrally of the metal beam 40 on the horizontal surface thereof and is secured to the metal beam in any suitable manner, such as by an adhesive. The pair of metal lengths 44 are disposed on the rubber strip 42 adjacent one longitudinal edge thereof and are secured to the rubber strip 42 by an adhesive or the like. The pair of metal lengths 44 are disposed in closely adjacent, parallel relation to one another to define therebetween a cutting slot 50.

As best seen in FIG. 1, the guide rail 24 is an elongated I-beam formed of aluminum or other metal and having a generally vertically extending web 52, a lower left-hand flange 54, a lower right-hand flange 56, an upper left-hand flange 58 and an upper right-hand flange 60. A rack 62 of a rack and pinion assembly is secured to the lower left-hand flange 54 of the guide rail 24, and a rack 64 of a second rack and pinion assembly is secured to the lower right-hand flange 56 of the guide rail 24. The racks 62, 64 can each be formed, for example, from a linearly extending section of a rubber timing belt. The web 52 has an extending length slightly less than that of the flanges 54, 56, 58 and 60 and is centrally axially located with respect thereto so that each flange projects axially beyond the web 52 at each axial end thereof. The major extent of the upper left-hand flange 58 extends laterally further than the lower left-hand flange 54 and a shoulder 66 is formed at each end of the major extent of the upper left-hand flange 58. Similarly, the major extent of the upper right-hand flange 60 extends further laterally than the lower right-hand flange 56 and the major extent thereof forms a shoulder 68 adjacent each axial end of the upper right-hand flange 60.

Each axial end of the guide rail 24 is slidably supported by a vertical guide post 70 of the guide rail support assembly 26. Each vertical guide post 70 is secured by welding or other means to the metal beam 40 adjacent one axial end thereof and extends generally perpendicularly thereto. Each vertical guide post 70 has a box-like, open-faced configuration and the vertical guide posts 70 are oriented with their open faces facing toward one another. Additionally, each vertical guide post 70 has a pair of spaced apart, generally parallel rectangular openings 72 formed therein extending generally parallel to the elastomeric strip 42.

Figure 5:
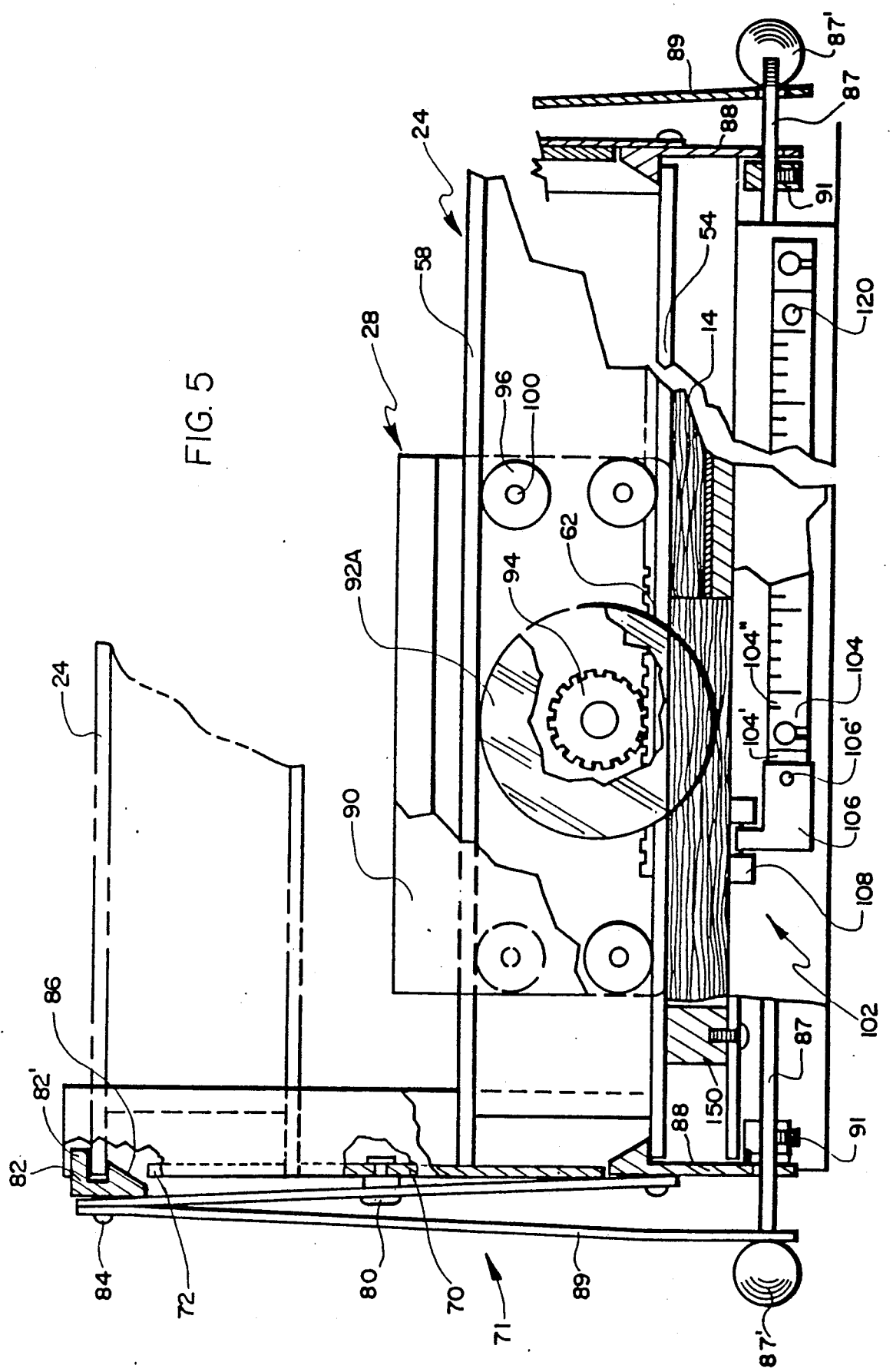
FIG. 5 is a detailed front elevational view, in partial vertical section, of the traveling dual cutter assembly of the insulation cutter illustrated in FIG. 1, and showing, in cutaway section, the cutter wheel for severing the insulation and its associated pinion gear and the left-hand guide rail post, and showing, in phantom lines, the guide rail in its feeding position.

An arrangement is provided for selectively locking the guide rail 24 at either a lower cutting position as shown in full lines in FIG. 5 and a raised insulation feeding position as shown in dotted lines in FIG. 5. The locking arrangement includes duplicate constructions 71 located at each side of the apparatus, one of which is illustrated in FIG. 5 and it being understood that an identical construction is provided at the other side of the apparatus. An elongated spring steel plate 78 is secured at approximately its mid-length to the vertical guide post 70 by a rivet 80 or similar attachment means. At each axial end portion of the spring steel plate 78, a wedge member 82 is secured thereto by rivets 84 or other attachment means. Each wedge member 82 is located relative to a respective one of the rectangular openings 72 of the vertical guide post 70 and is formed of metal or other suitable material. Each wedge member 82 has a sloped surface 86 and the pair of wedge members 82 of each vertical guide post 70 are arranged relative to one another such that their sloping surfaces 86 extend in opposite directions. The spring steel plate 78 resiliently biases the wedge members 82 to project through their respective associated rectangular openings 72. An operating rod 87 is arranged for sliding axial movement in a support plate 88 vertically extending from, and connected to the lower wedge member 84 and a connecting plate 89 made of relatively heavy-gauge metal is fixed at one of its ends to the operating rod 87 by a handle knob 87' thereof and is fixed at its other end to the spring plate 78 by the rivet 80. Also, the operating rod 87 includes a collar 91 fixed thereto at a location adjacent the inside surface of the vertical plate 88.

The rod 87 may be operated from the side of the apparatus to selectively release and lock the guide rail 24 in either of its raised or lowered positions. Thus, looking at FIG. 5 where this guide rail is shown locked in its lower position, rod 87 may be grasped at its knob 87' and pulled to the left, thereby causing the collar 91 to engage plate 88 and move the lower wedge member 84 out of its opening 72 to release the guide rail 24 at its left end. The rod 87 is then pushed in, and the identical sequence as that described above takes place to release the right end of guide rail 24. When each wedge member 82 is released, the inherent resiliency of the insulation material 14 will raise the guide rail 24 slightly so that the portion thereof shown beneath the lower wedge member 84 in FIG. 5 would engage the sloped surface 86 thereof, thereby permitting this guide rail 24 to be released and manually raised to its upper position as shown in dotted lines in FIG. 5 where it is engaged by the upper wedge member 82. At the raised position, operating rod 87 is used to release the guide rail 24 by moving it in both directions as described above. In this instance, movement of rod 87 to the left causes connecting plate 89 to move spring plate 78 outwardly away from the posts 70, whereby upper wedge member 82 is moved out of its opening 72 to release the left end of guide rail 24. The rod 87 is then moved to the right, and the identical sequence takes place to release this right end of the guide rail 24.

The traveling dual cutter assembly 28 includes a carriage 90, a pair of cutter wheels 92A and 92B, a pair of pinion gears 94, and a plurality of guide wheels 96. The carriage 90 is formed of metal and has an inverted U-shaped configuration. The interior area defined by the carriage 90 is such that the carriage can be disposed, open face downward, on the guide rail 24 with a slight clearance being provided between each inside surface of the carriage and the guide rail 24. Each cutter wheel 92A and 92B is rotatably mounted by a pivot pin 98 to a respective opposing inner side surface of the carriage 90, and each pinion gear 94 is fixedly mounted by bolts (not shown) or other appropriate attachment means to a respective one of the cutter wheels 92A and 92B for coaxial rotation therewith about the associated pivot pin 98. Each cutting wheel 92A and 92B is formed of a disc of finished metal and has its circumferential edge honed to a relatively sharp angle so that the cutting wheel properly cuts the fiberglass thickness or both the fiberglass fiber thickness and the aluminum covered backing without significant snagging during rotation of the cutting wheel therealong.

Each opposed inner side surface of the carriage 90 has four associated guide wheels 96 individually mounted thereto by four pivot pins 100. One pair of the four guide wheels 96 associated with each respective opposed inner side surface of the carriage 90 are disposed in spaced, superposed relationship to one another adjacent one edge of the side surface and the other pair of guide wheels are disposed in spaced, superposed relation to one another adjacent the opposed edge of the side surface.

The guide wheels 96 are cooperatively arranged with one another such that the carriage 90 is supported by the guide wheels 96 on the guide rail 24 for longitudinal movement along the guide rail 24. Specifically, the upper guide wheels 96 of one of the opposed inner side surfaces of the carriage 90 engage the upper left-hand flange 58 while the lower guide wheels engage the lower left-hand flange 54. Likewise, the upper guide wheels of the other opposed side surface of the carriage 90 engage the upper right-hand flange 60 and the lower guide wheels engage the lower right-hand flange 56 for rolling movement therealong. The guide wheels 96 are arranged so that the top or interconnecting side of the carriage 90 is supported at a slight clearance above the guide rail 24 when the carriage 90 is disposed on the guide rail 24. Also, due to the lateral extent of the top or interconnecting side of the carriage 90, the opposed sides of the carriage are maintained at a slight clearance from the upper left-hand flange 58 and the upper right-hand flange 60 of the guide rail 24 during longitudinal movement of the carriage 90 along the guide rail 24.

The pinion gears 94 are configured to cooperate with the racks 62, 64. Specifically, each pinion gear 94 is of a suitable diameter so that the teeth thereof engage one of the racks 62, 64 when the carriage 90 is disposed on the guide rail 24 with its guide wheels 96 in rolling engagement with the respective flanges of the guide rail.

The insulation cutting apparatus 10 additionally includes a selectively deployable ruler assembly 102 which has a ruler 104 pivotally coupled to a bracket 106 at pivot connection 106' and the bracket 106 is connected by a hinge member 108 to one side of the metal beam 40 of the insulation support surface assembly 22. The ruler 104 is similar in construction to a conventional carpenter rule, and includes a first part 104' pivotally connected to the bracket 106 and a second part 104" pivotally connected to first part 104' at pivot pin 120.

In accordance with a further feature of the present invention, a retention element 122 having a threaded lower portion 124 (see FIG. 3) may be screwed into a threaded opening 126 in the top side to cutter assembly 28. By manually turning the retention element 122, the threaded lower end portion 124 thereof can be made to engage the top of the guide rail 24 and thereby retain the cutter assembly 28 in place and prevent any movement thereof along the guide rail 24 whenever desirable (e.g. during assembly, disassembly or shipping of the cutter assembly 28).

In operation, the insulation cutting apparatus 10 is placed on the table 34 and the insulation roll 20 is disposed in the cradle assembly 18. The insulation support surface assembly 22 with the vertical guide posts 70 projecting perpendicularly therefrom is secured via the flanges 36 at its predetermined spacing from the cradle assembly 18. The carriage 90 is inserted onto one axial end of the guide rail 24 such that the guide wheels 96 roll on their respective associated flanges of the guide rail 24. Additionally, the pinion gears 94 are thereby brought into meshing engagment with their respective racks 62, 64. The guide rail 24 is then disposed between the pair of vertical guide posts 70 by inserting the axial end portions of the guide rail 24 into the open faces of the vertical guide posts 70. The shoulders 66, 68 of the guide rail 24 are compatibly configured with the opposite sides of each vertical guide post 70 so that the guide rail 24 is constrained from side-to-side or lateral movement once it is disposed between the vertical guide posts 70 and is substantially constrained from axial or longitudinal movement.

Initially, the guide rail 24 is disposed in a raised or insulation feeding position relative to the cutting bed 22 by operating the rod 87 such that the lower wedge members 84 of each steel plate 78 are withdrawn from their respective associated rectangular openings 72 in the vertical guide posts 70. The guide rail 24 is then manually raised until the upper left-hand flange 58 and the upper right-hand flange 60 at each axial end thereof engage the upper wedge members 84, which are disposed in their associated rectangular openings 72. Specifically, the upper left-hand flange 58 and the upper right-hand flange 60 of the guide rail 24 engage the sloped surface 86 of the upper wedge members 84 and push these wedge members outwardly from their associated rectangular openings 72. The upper wedge members 84 are immediately moved, under the action of their associated spring steel plates 88, into their inserted positions to support the guide rail 24 as the upper flanges of the guide rail move vertically beyond the sloping surfaces 86 of the upper wedge members 84. In this raised position of the guide rail 24, ample clearance between the bottom of the guide rail and the insulation support surface assembly 22 is provided for feeding a length of the insulation batting material 14 thereacross.

To feed the insulation batting, a length of the insulation batting material 14 is pulled through the clearance between the guide rail 24 and the insulation support surface assembly 22 in a direction generally transverse to the longitudinal extent of the guide rail 24, the insulation batting material 14 unrolling from the roll 20 until the extent of the unrolled material between its leading edge and the line extending transversely to the feed direction which is defined by the right-hand cutter wheels 92B is approximately equal to the requisite length of the aluminum covered backing 110, including its overlapping portions, which is needed to encircle the duct length 16. To facilitate the rapid and accurate unrolling of the insulation batting material 14 from the roll 20, the ruler 104 is extended from its retracted position generally flush along the side of the metal beam 40 of the insulation support surface assembly 22 to a deployed position in which the ruler extends generally perpendicular and horizontal to the insulation support surface assembly 22. The deployment of the ruler 104 is accomplished by swiveling the bracket 106 through approximately 90° about the hinge member 108 and then pivoting the ruler 104 approximately 90° about its pivot connection 106' with the bracket 106. If necessary, the effective length of the ruler 104 may be extended by pivoting the second part 104" outwardly about pivot pin 120 until it is an extension of the first part 104'. The deployed position of the ruler 104 is illustrated in FIG. 1. The ruler 104 may be calibrated at standard insulation withdrawal lengths such that the user can simply extend the leading edge of the insulation batting material 14 to the appropriate marking on the ruler 104 to accurately position the length of insulation batting material 14 for engagement by the traveling dual cutter assembly 28.

Once the unrolled insulation batting material 14 has been extended to the proper length for engagement by the traveling dual cutter assembly 28, the rod 87 is operated to release the guide rail 24 from its raised, insulation feeding position. Specifically, the rod 87 is operated to withdraw the upper wedge members 84 from their associated rectangular openings 72 as described above, and the guide rail 24 is manually lowered along the vertical guide posts 70. During continued lowering of the guide rail 24, the lower left-hand flange 54 and the lower right-hand flange 56 eventually slide against the lower wedge members 84, and drive these lower wedge members 84 outwardly of their associated rectangular openings 72 against the bias of the spring steel plates 88. Once the lower left-hand flange 54 and the lower right-hand flange 56 clear the lower wedge members 84, the biasing action of the spring steel plates 88 fully inserts the lower wedge members 84 back into their associated rectangular openings 72 on the vertical guide posts 70, thereby securing the guide rail 24 in its lower, insulation engaging position illustrated in FIG. 5. The fiberglass fiber disposed between the guide rail 24 and the insulation support surface assembly 22 is slightly compressed as the guide rail 24 comes to rest upon stops 150, one of which is shown in FIG. 5.

With the guide rail 24 resting under its own weight on top of the insulation batting material 14 and constrained from upward movement by the action of the lower wedge members 84, the traveling dual cutter assembly 28, which prior to this time has been disposed toward one end of the guide rail 24, is manually actuated by the operator to perform its dual cutting functions. The operator manually moves the carriage 90 longitudinally along the guide rail 24, at an appropriate speed with the guide wheels 96 rolling along the associated flange surfaces of the guide rail 24. If the user exerts a slight downward pressure on the carriage 90, the lower pairs of guide wheels 96 engage their respective flange surfaces while the upper pairs of guide wheels 96 only intermittently engage their respective flange surfaces. Simultaneously with the longitudinal movement of the carriage 90 along the guide rail 24, the pinion gears 94 meshingly engage their respective racks 62, 64 and thereby rotate their associated cutting wheels 92A and 92B.

Figure 3:
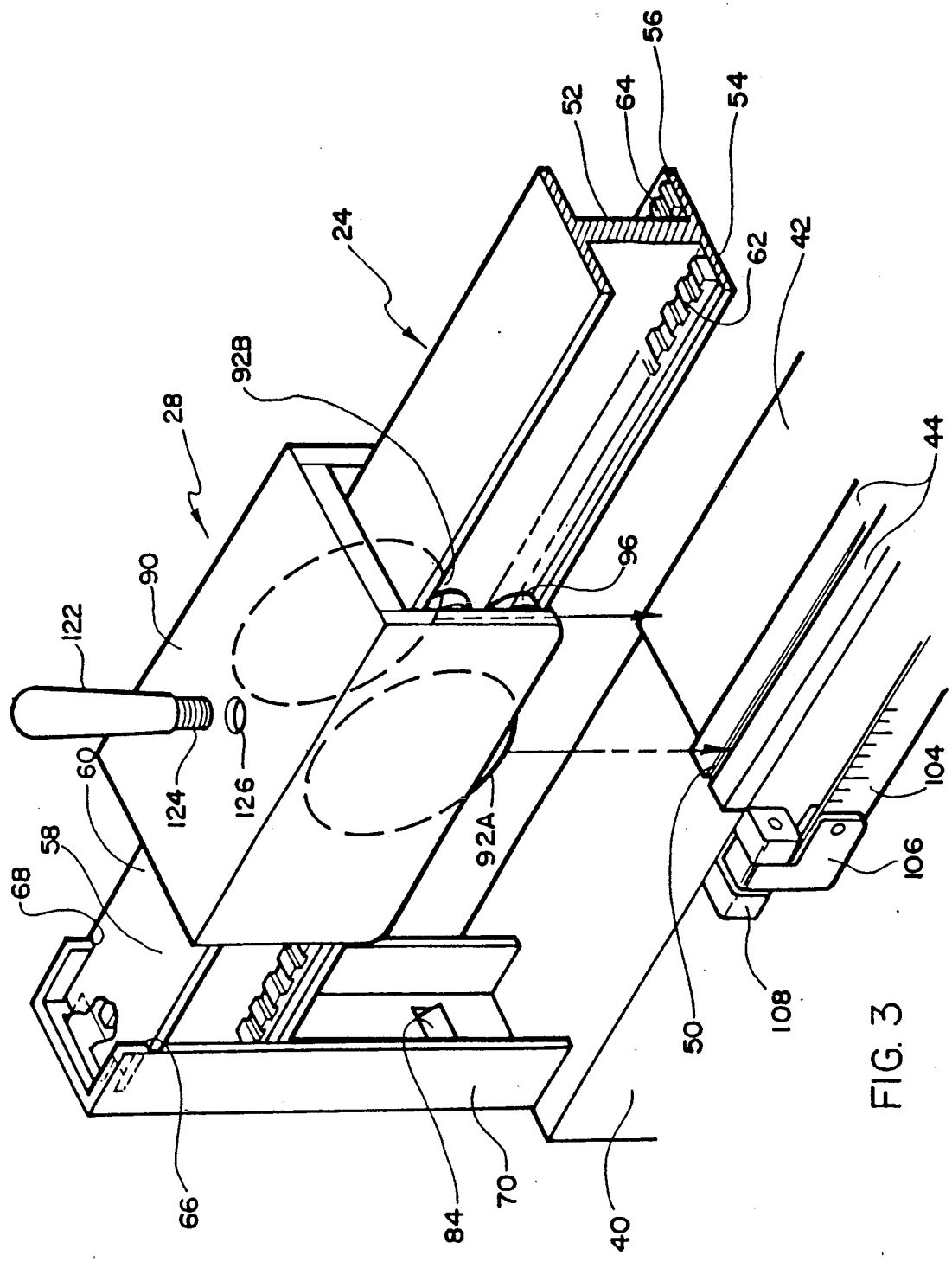
FIG. 3 is a perspective view of the guide rail and traveling dual cutter assembly of the insulation cutter of the present invention in their raised, insulation feeding position, showing the cutting wheels in phantom lines, and the cutting bed in solid lines, and showing, in cutaway section, the locking engagement position of the guide rail locking device with respect to the guide rail.

As illustrated in FIG. 3, the insulation support surface assembly 22, the vertical guide posts 70, the guide rail 24 and the traveling dual cutter assembly 28 are cooperatively arranged so that the cutting wheels 92A and 92B each travel along predetermined paths with respect to the insulation support surface assembly 22. Specifically, the cutting wheel 92A is vertically aligned with the slot 50 defined between the metal lengths 44 to travel along a severing path and the cutting wheel 92B is aligned with the rubber strip 42 to travel along a cutting path. Accordingly, as the carriage 90 travels longitudinally along the guide rail 24 and the cutting wheels 92A and 92B are correspondingly rotated by their respective pinion gears 94, the lowermost portion of the rotating cutting wheel 92A extending below the carriage 90 moves within the slot 50 so as to thereby penetrate through both the fiberglass fiber thickness and the aluminum covered backing, and cut through both. The two metal lengths 44 defining the slot 50 act as support surfaces for the insulation batting material 14 and support the insulation batting against the downwardly directed cutting forces of the rotating cutting wheel 92A. The result is that the fiberglass fiber thickness and the aluminum covered backing along the severing path are neatly and cleanly cut by the cutting wheel 92A as the cutting wheel rotates during longitudinal movement of the carriage 90 along the guide rail 24. The insulation length 12 is thus completely severed by the cutting wheel 92A from the leading edge portion of the next length of insulation batting material 14.

Simultaneously with the severing of the insulation length 12 from the insulation batting material 14 by the cutting wheel 92A, the cutting wheel 92B, as best seen in FIG. 4, is rotated by its pinion gear 94 to cuttingly engage the trailing portion of the unrolled insulation batting material 14. The cutting wheel 92B neatly and cleanly cuts the fiberglass fiber thickness along the cutting path substantially without cutting the aluminum covered backing 110 during the longitudinal movement of the carriage 90 along the guide rail 24. Instead of cutting the aluminum covered backing, the cutting wheel 92B presses the aluminum covered backing downwardly against the rubber strip 42 upon which the backing is supported. Due to the yielding nature of the rubber strip 42, the strip 42 yields sufficiently under the downward pressure of the backing 110 thereupon such that the aluminum covered backing is not cut by the rotating cutting wheel 92B but, instead, is pressed between the lowermost portion of the rotating cutting wheel 92B and the rubber strip 42 without significant or detrimental cutting thereof. Accordingly, the aluminum covered backing 110 remains completely or virtually unscathed while the fiberglass fiber thickness on the backing is neatly and cleanly cut along the cutting path by the rotating cutting wheel 92B, thereby creating a band 112 of fiberglass fiber thickness adjacent the leading edge portion of the next length of the insulation batting material 14 which is easily removed to expose an elongate rectangular strip 114 of the backing thereunder. As seen in FIG. 1, the insulation length 12 had been similarly prepared for the removal of a discard band 112 therefrom when the preceding length of insulation batting material 14 had been severed from the insulation length 12 by the cutting action of the traveling dual cutter assembly 28. Thus, each leading edge portion of the next length of the insulation batting material 14, which next length becomes the severed insulation length 12 upon the next cutting cycle of the traveling dual cutter assembly 28, is prepared by the cutting action of the cutting wheel 92B for the easy removal of the band of fiberglass fiber thickness 112 therefrom.

Figure 2:
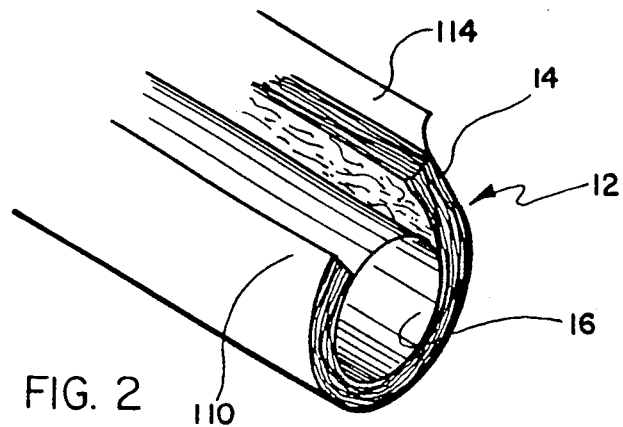
FIG. 2 is a partial perspective view of an individual duct length in the process of being circumferentially encircled by a length of insulation batting prepared by the insulation cutter of the present invention.

As shown in FIG. 2, the exposed elongate strip 114 readily and neatly overlies the aluminum covered backing 110 of the other end portion of the insulation length 12 when the two end portions of the insulation piece are brought into substantially contacting relationship as the piece is disposed in its encircling disposition on the duct 16. The insulation installer can then readily drive staples or other attachment means through the top surface of the elongate strip 114 into the underlying aluminum covered backing and the fiberglass fiber thickness of the other end portion of the insulation length 12 to permanently secure the insulation piece on the duct length 16.

Once the carriage 90 has been moved beyond the insulation batting material 14, thus completing its severing and cutting action, the guide rail 24 can be raised to its insulation feeding position to prepare for the advancement of the next length of the insulation batting material 14, by operating the rod to withdraw the lower wedge members 84 from their associated rectangular openings 72 as described above. It will be noted upper wedge member 82 is formed with an upper shoulder 82' which, when wedge member 82 is in its normal position inserted in opening 72, will provide a stop located in the path of the guide rail 24 as it is raised to prevent guide rail 24 from inadvertently being removed altogether. Thereafter, a further length of the insulation batting material 14 is unrolled from the insulation roll 20 and its leading edge drawn out to the appropriate marking on the ruler 104. The guide rail 24 is then lowered to its lower, insulation cutting disposition and the longitudinal movement of the carriage 90 along the guide rail 24 is repeated to sever another insulation length 12 from the insulation batting material 14.

The insulation cutting apparatus 10 therefore specially prepares the insulation length 12 for its permanent disposition on the duct length 16 by severing the insulation piece 12 from the insulation batting 14 rolled on the insulation roll 20, and by cutting the insulation length 12 along a predetermined cutting line to facilitate removal of a discard band of fiberglass 114. Once the discard band 114 is removed from the insulation length 12, the piece is advantageously configured for permanent securement in an encircling disposition about the individual duct length 16 to provide desirable insulating benefits about the entire circumference of the duct length 16. The duct length 16 can be a length of conventional ductwork frequently used in heating and cooling systems of a wide variety of building structures. Additionally, the duct length 16 can be a separate length of duct not yet installed in line with other individual duct lengths or may be already installed in line with other duct lengths which together form a conduit for the movement therethrough of heated or cooled air. The heated or cooled air may travel through the duct lengths between, for example, a furnace or air conditioning unit and various downstream outlets such as, for example, air vents, registers and the like.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. Apparatus for severing a length of insulation batting from a supply thereof along a severing path, the insulation batting having insulating material mounted on a backing, and for cutting along a cutting path through the insulating material substantially without cutting of the backing to create a discrete band of insulating material which is easily removable to expose the strip of backing thereunder, comprising:

means having a surface for supporting the portion of the insulation batting between and adjacent the severing path and the cutting path;

first cutter means movable relative to said support surface means;

said support surface means having a severing path support portion for supporting the insulation batting at a position along the severing path, said severing path support portion being positioned with respect to said first cutter means to cooperate therewith for allowing said first cutter means to cut through the insulating material and the backing along the severing path, thereby severing the insulation batting length from the insulating batting supply; and second cutter means movable relative to said support surface means, said support surface means having a cutting path support portion for supporting the insulation batting at a position along the cutting path, said cutting path support portion being positioned with respect to said second cutter means to cooperate therewith for allowing said second cutter means to cut through the insulation material substantially without cutting the backing and said cutting path support portion being formed of a generally deflectable material such that said cutting path support portion deflects in response to the force applied thereagainst by said second cutter means during said cutting of the insulating material by said second cutter means to permit the backing to be accommodated between said second cutter means and said cutting path support portion with substantially no penetration of the backing by said second cutter means, thereby creating a discrete band of insulating material adjacent one edge of the insulation batting which is easily removable to expose the backing thereof.

2. Apparatus according to claim 1 and characterized further in that the severing path and the cutting path are generally parallel to one another and said first and second cutter means are located in a predetermined spaced relation to one another.

3. Apparatus according to claim 2 and characterized further in that said first and second cutter means are connected for simultaneous movement relative to said support surface means.

4. Apparatus according to claim 3 and characterized further by a carriage mounted for movement along a carriage rail, said first and second cutters being mounted in said carriage.

5. Apparatus according to claim 4 and characterized further in that said carriage rail is movable between a cutting position in which said first cutter means cuts the insulation batting and said second cutter means cuts the insulating material during movement of said carriage along said carriage rail, and a feeding position in which said first and second cutter means are sufficiently spaced from said support surface means to permit feeding of the insulation batting over said support surface means in a direction generally transverse to the direction of movement of said carriage along said carriage rail.

6. Apparatus according to claim 5 and characterized further in that each axial end of said carriage rail is received in a guide post assembly, said guide post assembly including means for releasably securing said carriage rail in said cutting and feeding positions.

7. Apparatus according to claim 4 and characterized further in that said carriage rail includes a pair of gear racks extending axially therealong, said first and second cutting means each include a wheel having sharpened circumferential edge, each wheel being rotatably mounted to said carriage by a shaft and said wheel shafts each having a pinion gear coaxially fixedly mounted thereon, each of said pinion gears being cooperatively arranged to engage one of said gear racks to thereby effect driving rotation of said pinion gears by said gear racks during movement of said carriage along said carriage rail.

8. Apparatus according to claim 7 and characterized further in that said carriage rail is an I-beam, and said carriage includes a plurality of guide wheels rotatably mounted thereon and located to rollingly engage opposed flange surfaces of said guide rail, whereby said guide wheels support and guide said carriage on said carriage rail during movement of said carriage along said carriage rail.

9. Apparatus according to claim 1 and characterized further in that said severing path support portion includes a slot positioned with respect to said first cutting means to receive therethrough a portion of said first cutting means extending beyond and through the backing.

10. Apparatus according to claim 1 and characterized further in that said cutting path support portion is formed of an elastomeric material.

11. Apparatus according to claim 1 and characterized further in that first and second cutter means are carried in a carriage means during said movement relative to said support surface means, and in that said carriage means is selectively positionable between a cutting position in which said first and second cutter means cut the insulation batting and a feeding position in which said first and second cutter means are sufficiently spaced from said support surface means to permit feeding of the insulation batting over said support surface means in a direction generally transverse to the direction of movement of said carriage means during cutting of said insulation batting.

12. Apparatus for severing a length of insulation batting from a supply thereof along a severing path, the insulation batting having insulating material mounted on a backing, and for cutting along a cutting path through the insulating material substantially without cutting the backing to create a discrete band of insulating material which is easily removable to expose the strip of backing thereunder, comprising:
an insulation supply holder for holding the insulation batting supply in a convenient disposition for feeding of lengths of insulating batting therefrom,
a cutting bed for supporting a length of insulation batting thereon with said backing being disposed on said cutting bed and with the insulation material above said backing, during the severing and cutting of the insulation batting length, the cutting bed including a slot member defining a longitudinal severing slot and a cutting platform of generally resilient, deflectable material,
a traveling dual cutter assembly having a carriage, a pair of laterally spaced cutting wheels and a pair of axles rotatably mounting the cutting wheels to the carriage,
a generally elongate guide rail for supporting the carriage for travel therealong, the guide rail having a pair of laterally spaced, generally parallel, longitudinally extending gear racks.
a guide rail support frame for supporting the guide rail above the cutting bed, the frame having means for permitting movement of the guide rail between a cutting position at which the traveling dual cutter assembly supported thereon engages the insulation for severing and cutting thereof and an insulation feed position at which sufficient clearance is provided between the guide rail and the cutting bed for the feeding of insulation therebetween,
the traveling dual cutter assembly further including a pinion gear secured to each axle, each pinion gear being adapted to engage one of the longitudinal gear racks of the guide rail for rotation thereby in response to travel of the carriage along the guide rail, whereby the cutting wheels are caused to rotate in response to travel of the carriage along the guide rail and the guide rail, the carriage and the cutting bed being arranged relative to one another such that one of the cutting wheels penetrates through the insulation length into the longitudinal severing slot to sever the insulation length from the insulation supply and such that the cutting platform deflects sufficiently in response to the force exerted thereagainst by the other cutting wheel to permit the backing to pass between the other cutting wheel and the cutting platform without being cut by the other cutting wheel, whereby the other cutting wheel cuts the insulating material so that the insulating material located between the two cutting elements is removable to expose a predetermined length of the backing.

13. A method of severing insulation batting from a supply thereof along a severing path, the insulating batting including insulating material mounted on a backing, said method comprising the steps of:

a) positioning a length of insulation batting along a support surface a portion of which is formed of resilient material;

b) providing a first cutting element movable along a first path of movement and a second cutting element movable along a second path of movement;

c) positioning said resilient material portion of said support surface so that it is in direct engagement with said backing along said second path of movement of said second cutting element;

d) moving said first cutting element along said first path of movement with said first cutting element extending through said insulating material and said backing to sever both;

e) simultaneously moving said second cutting element along said second path of movement in a movement in which said second cutting element depresses said backing into said resilient material sufficiently to allow said second cutter element to cut through substantially all of said insulating material without significantly cutting said backing; and f) removing that portion of said insulating material from said backing which is located between said first and second paths of movement to expose a length of backing that is sufficiently long to permit said exposed length of backing to be secured to the uncut portion of said length of insulating batting when it is installed.

* * * * *